US012794941B2

(12) United States Patent
Chen

(10) Patent No.: US 12,794,941 B2
(45) Date of Patent: Nov. 10, 2026

(54) TRAFFIC PROCESSING METHOD AND APPARATUS, AND MEDIUM AND ELECTRONIC DEVICE

(71) Applicant: Beijing Volcano Engine Technology Co., Ltd., Beijing (CN)

(72) Inventor: Guo Chen, Beijing (CN)

(73) Assignee: Beijing Volcano Engine Technology Co., Ltd., Beijing (CN)

( * ) Notice: Subject to any disclaimer, the term of this patent is extended or adjusted under 35 U.S.C. 154(b) by 78 days.

(21) Appl. No.: 19/103,814

(22) PCT Filed: Apr. 29, 2024

(86) PCT No.: PCT/CN2024/090467
§ 371 (c)(1),
(2) Date: Feb. 13, 2025

(87) PCT Pub. No.: WO2024/230541
PCT Pub. Date: Nov. 14, 2024

(65) Prior Publication Data

US 2026/0089188 A1 Mar. 26, 2026

(30) Foreign Application Priority Data

May 10, 2023 (CN) ........................ 202310525725.1

(51) Int. Cl.
*H04L 9/40* (2022.01)
*H04L 69/164* (2022.01)

(52) U.S. Cl.
CPC ........ *H04L 63/1458* (2013.01); *H04L 63/162* (2013.01); *H04L 9/40* (2022.05); (Continued)

(58) Field of Classification Search
None
See application file for complete search history.

(56) References Cited

U.S. PATENT DOCUMENTS 8,613,089 B1 * 12/2013 Holloway ............. G06F 21/577 709/227
11,190,487 B2 * 11/2021 Xu ...................... H04L 63/1425
(Continued)

FOREIGN PATENT DOCUMENTS

CN 102026199 A 4/2011
CN 104348811 A 2/2015
(Continued)

OTHER PUBLICATIONS

International Search Report and Written Opinion received for PCT Patent Application No. PCT/CN2024/090467, mailed on Jul. 16, 2024, 11 pages (5 pages of English Translation and 6 pages of Original document).

(Continued)

*Primary Examiner* — Ali H. Cheema
(74) *Attorney, Agent, or Firm* — Astute IP Law Group

(57) ABSTRACT

The present disclosure relates to a traffic processing method and apparatus, and a medium and an electronic device. The traffic processing method includes: performing detection on incoming traffic, which flows to a server, and determining whether the server is subjected to a distributed denial of service (DDoS) attack; when it is determined that the server is subjected to the DDoS attack, determining whether the message format of a message in the incoming traffic is normal, and intercepting a message which has an abnormal message format, wherein the incoming traffic is generated on the basis of a quick user datagram protocol Internet connection (QUIC) protocol; and intercepting an abnormal message in a first message, wherein the first message is a message that has a normal message format.

20 Claims, 7 Drawing Sheets

(52) U.S. Cl.
CPC ...... *H04L 63/1416* (2013.01); *H04L 63/1425* (2013.01); *H04L 63/306* (2013.01); *H04L 69/164* (2013.01)

(56) References Cited

U.S. PATENT DOCUMENTS

| | | | | |
|---|---|---|---|---|
| 2011/0066896 | A1 | 3/2011 | Ebina et al. | |
| 2015/0052601 | A1 * | 2/2015 | White | H04L 63/1416 726/13 |
| 2019/0014145 | A1 * | 1/2019 | Levine | H04L 63/0869 |
| 2021/0099482 | A1 * | 4/2021 | Doron | H04L 43/0894 |
| 2024/0365121 | A1 * | 10/2024 | Northway | H04L 41/22 |

FOREIGN PATENT DOCUMENTS

| | | | | | |
|---|---|---|---|---|---|
| CN | 106911669 | A | | 6/2017 | |
| CN | 107404459 | A | | 11/2017 | |
| CN | 109309685 | A | * | 2/2019 | H04L 63/1416 |
| CN | 110138797 | A | | 8/2019 | |
| CN | 111147524 | A | | 5/2020 | |
| CN | 112751815 | A | | 5/2021 | |
| CN | 113518042 | A | | 10/2021 | |
| CN | 114039763 | A | | 2/2022 | |
| CN | 114285805 | A | * | 4/2022 | |
| CN | 102882894 | A | | 1/2023 | |
| CN | 115842878 | A | * | 3/2023 | |
| CN | 115987536 | A | * | 4/2023 | H04L 69/164 |
| CN | 116074026 | A | * | 5/2023 | H04L 61/4511 |
| KR | 10-2019-0083498 | A | | 7/2019 | |
| WO | 2015/018303 | A1 | | 2/2015 | |

OTHER PUBLICATIONS

Office Action received for Chinese Patent Application No. 202310525725.1, mailed on Apr. 16, 2025, 22 pages (11 pages of English Translation and 11 pages of Original Document).

Extended European Search Report received for European Application No. 24802825.0, mailed on Feb. 9, 2026, 10 pages.

Iyengar et al., "QUIC: A UDP-Based Multiplexed and Secure Transport", Internet Engineering Task Force (IETF) Request for Comments : 9000 Category: Standards Track ISSN: 2070-1721, May 27, 2021, 95 pages.

Kühlewind et al., "Manageability of the QUIC Transport Protocol", Internet Engineering Task Force (IETF) Request for Comments: 9312 Category: Informational ISSN: 2070-1721, Sep. 27, 2022, 18 pages.

Office Action received for Singaporean Patent Application No. 10202401286R, mailed on Apr. 1, 2026, 10 pages.

* cited by examiner

TRAFFIC PROCESSING METHOD AND APPARATUS, AND MEDIUM AND ELECTRONIC DEVICE

CROSS-REFERENCE TO RELATED APPLICATIONS

The present application is a U.S. National Stage Application under 35 U.S.C. § 371 of International Patent Application No. PCT/CN2024/090467, filed on Apr. 29, 2024, which claims priority to China Patent Application No. 202310525725.1 filed on May 10, 2023, the disclosure of both of which are incorporated by reference herein in their entireties.

TECHNICAL FIELD

The present disclosure relates to a traffic processing method and apparatus, a medium and an electronic device.

BACKGROUND

Quick UDP Internet Connection (QUIC) protocol is an encrypted and connection-oriented protocol developed based on User Datagram Protocol (UDP). Based on the QUIC protocol, the characteristics of multiplexing and connection migration are may better supported whilst reliable transmission, congestion control and data encryption can be achieved, and it can provide faster, more efficient and simpler encrypted traffic communication than TCP (Transmission Control Protocol)+TLS (Transport Layer Security).

SUMMARY

The summary is provided to introduce concepts in a concise form, which will be described in detail in the following detailed description. The summary is neither intended to identify the key features or essential features of the claimed technical solution, nor intended to limit the scope of the claimed technical solution.

According to a first aspect of the present disclosure, a traffic processing method is provided. The traffic processing method comprises: detecting incoming traffic flowing to a server to determine whether the server is attacked by a distributed denial of service (DDoS); in response to determining that the server is attacked by the distributed denial of service (DDoS), determining whether a message format of a message in the incoming traffic is normal, and intercepting the message with an abnormal message format, wherein the incoming traffic is generated based on a quick user datagram protocol internet connection (QUIC) protocol; and intercepting an abnormal message in a first message, wherein the first message is a message with a normal message format.

According to a second aspect of the present disclosure, a traffic processing apparatus is provided. The traffic processing apparatus comprises: a detection module configured to detect incoming traffic flowing to a server to determine whether the server is attacked by a distributed denial of service (DDoS); a first protection module configured to, in response to determining that the server is attacked by the distributed denial of service (DDoS), determine whether a message format of a message in the incoming traffic is normal, and intercept the message with an abnormal message format, wherein the incoming traffic is generated based on a quick user datagram protocol internet connection (QUIC) protocol; and a second protection module configured to intercept an abnormal message in a first message, wherein the first message is a message with a normal message format.

According to a third aspect of the present disclosure, a computer-readable medium is provided. The computer-readable medium has a computer program stored thereon that, when executed by a processing device, implements the traffic processing method in the first aspect.

According to a fourth aspect of the present disclosure, an electronic device is provided. The device electronic comprises: a storage device having a computer program stored thereon; and a processing device configured to execute the computer program in the storage device to implement the traffic processing method in the first aspect.

According to a fourth aspect of the present disclosure, a computer program is provided. The computer program comprises instructions that, when executed by a processor, cause the processor to implement the traffic processing method in the first aspect.

Other features and advantages of the present disclosure will be described in detail in the following detailed description.

BRIEF DESCRIPTION OF THE ACCOMPANYING DRAWINGS

The above-described and other features, advantages and aspects of embodiments of the present disclosure will become more apparent in conjunction with the accompanying drawings and with reference to the following detailed description. Throughout the accompanying drawings, the same or similar reference numerals indicate the same or similar elements. It should be understood that the accompanying drawings are schematic, and the members and elements are not necessarily drawn to scale. In the accompanying drawings.

DETAILED DESCRIPTION

Figure 1:
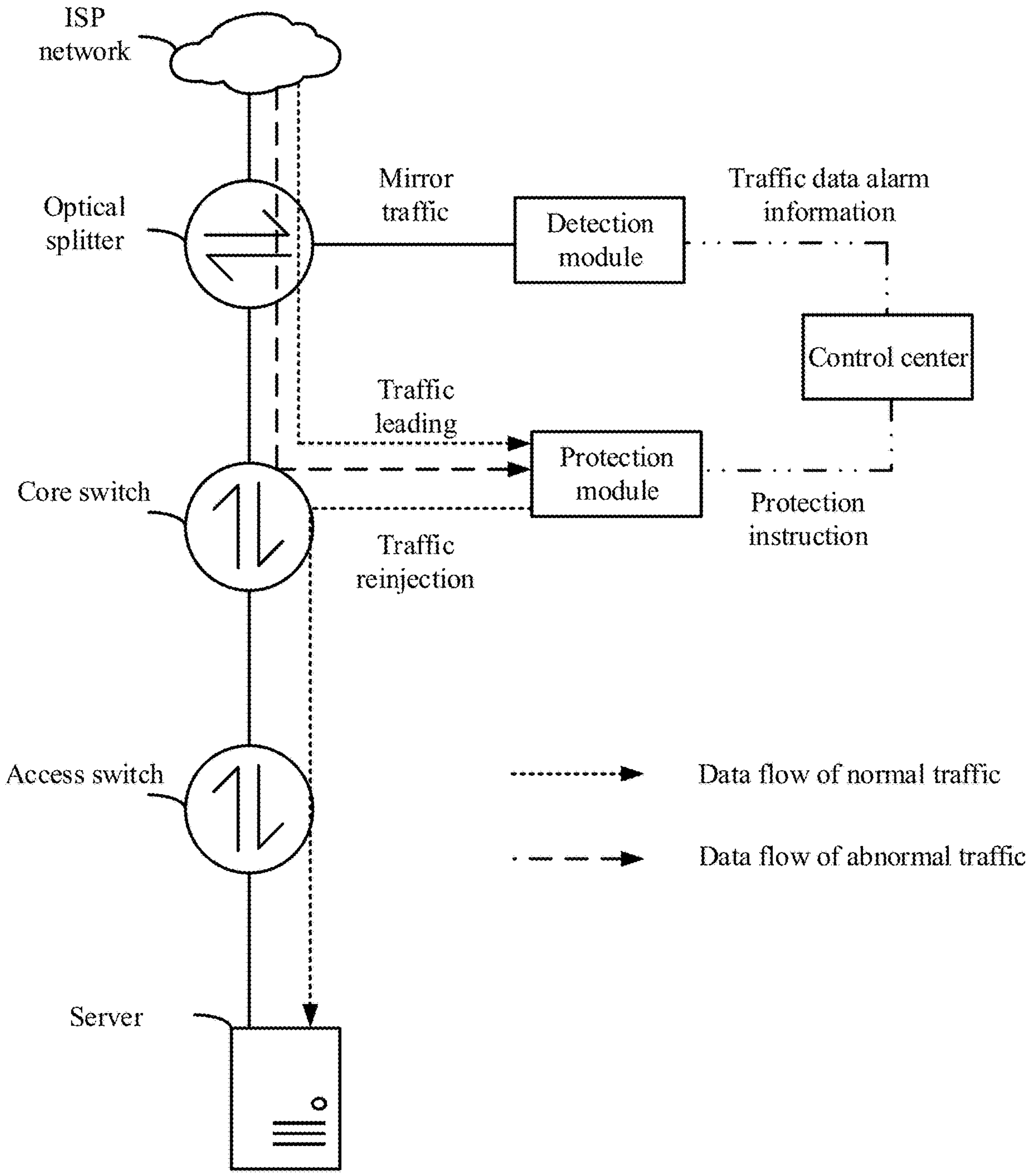
FIG. 1 is an architecture diagram of a system for implementing a traffic processing method shown according to an exemplary embodiment of the present disclosure.

The embodiments of the present disclosure will be described in more detail with reference to the accompanying drawings below. Although the accompanying drawings illustrate some embodiments of the present disclosure, it should be understood that the present disclosure may be implemented in various forms, and should not be construed as being limited to the embodiments set forth herein. Rather, these embodiments are intended for a more thorough and complete understanding of the present disclosure. It should be understood that the accompanying drawings and embodiments of the present disclosure are only for illustrative purposes, rather than for limiting the protection scope of the present disclosure.

It should be understood that the various steps recited in the method embodiments of the present disclosure may be performed according to different sequences, and/or performed in parallel. In addition, the method embodiments may comprise additional steps and/or omit to perform the illustrated steps. The scope of the present disclosure is not limited in this respect.

As used herein, the term "comprising" and its variants are open-ended inclusion, that is, "comprising but not limited to". The term "based on" means "at least partially based on". The term "one embodiment" means "at least one embodiment"; the term "another embodiment" means "at least one additional embodiment"; and the term "some embodiments" means "at least some embodiments". The related definitions of other terms will be given in the following description.

It should be noted that the concepts such as "first" and "second" mentioned in the present disclosure are only used to distinguish different devices, modules or units, but not to limit the order or interdependence of functions performed by these devices, modules or units.

It should be noted that the modifications of "one" and "a plurality of" mentioned in the present disclosure are illustrative rather than restrictive, and those skilled in the art should understand that they should be understood as "one or more" unless contextually specified otherwise.

The names of messages or information exchanged between multiple devices in the embodiments of the present disclosure are only used for illustrative purposes, but not for limiting the scope of these messages or information.

It may be understood that, the user should be notified of the types, scope of use, and usage scenarios of personal information involved in the present disclosure in an appropriate way according to relevant laws and regulations and user authorization should be obtained before the technical solution disclosed in each embodiment of the present disclosure is used.

For example, in response to receiving an active request from the user, prompt information is sent to the user to specifically prompt the user that the operation requested to be performed will require obtaining and using personal information of the user. Therefore, the user may independently choose whether to provide personal information to software or hardware such as electronic devices, applications, servers or storage media that perform the operations in the technical solution of the present disclosure according to the prompt information.

As an alternative but non-delimiting implementation, in response to receiving an active request from the user, the method of sending the prompt information to the user may be, for example, a pop-up window, in which the prompt information may be presented in text. In addition, the pop-up window may also carry a selection control for the user to choose "agree" or "disagree" to provide personal information to the electronic device.

It may be understood that, the above-described process of notifying and obtaining user authorization which is only schematic, does not constitute the delimitation on the implementation of the present disclosure. Other implementations to meet relevant laws and regulations may also be applied to the implementation of the present disclosure.

At the same time, it may be understood that, the data involved in the technical solution (comprising but not limited to the data itself, data acquisition or use) should comply with the requirements of corresponding laws, regulations and relevant rules.

Distributed Denial of Service (DDoS) attack is an attack means that controls botnets distributed all over the Internet to initiate a large number of malicious service requests to the server, which makes it impossible for the server to respond to a normal service request initiated by a normal client, so that denial of service is caused. For example, botnets control abnormal clients to send a large number of forged abnormal traffic based on a QUIC protocol to the server, which forces the server to be busy with a large number of abnormal traffic, so that the resources of the server are exhausted, or a network card of the server is blocked by abnormal traffic, which eventually leads to server crash, so that it is impossible to provide a service to the outside normally. The attack means that causes server crash by forged abnormal traffic based on a QUIC protocol is referred to as QUICFlood.

QUICFlood mainly comprises two types, in which one is a forged QUIC message with a normal message format and a target port is set to be a port 443, and the other is a QUIC message filled with UDP load randomly, and the target port is set to be a port 443, wherein the port 443 is a port used by the QUIC protocol.

Compared with other DDoS attack means, the QUIC protocol itself is based on a UDP protocol, but the protection on a UDP protocol is very weak, which eventually leads to severe deficiency of protection means for QUICFlood. Moreover, a normal QUIC message may generally be encrypted, and a protection device upstream of the server cannot perform decryption or distinguish whether the QUIC message is normal QUIC traffic or forged abnormal QUIC traffic by checking the transmission data as a key is absent. In addition, if the attacked server itself provides QUIC service to the outside, the normal service is normal traffic based on the QUIC protocol, and the attacker forges abnormal traffic based on QUIC, so that it is difficult to distinguish them from the traffic itself, which eventually leads to a protection difficulty.

On such basis, for QUICFlood, the server avoids server crash by not providing a QUIC service or rate limit of the traffic of the client. For example, the server may prohibit providing the QUIC service by directly closing the port 443, or the server may impose rate limit on the traffic of the client by a solution based on the IP (Internet Protocol) address of the client and the geographical location of the source, which will both cause accidental harm to normal traffic and engender the risk of transparent transmission of abnormal traffic. The accidental harm means that, since rate limit pertains to indiscriminate packet loss, in the case where the QUIC traffic of a normal client itself is particularly large, it is possible to lead to packet loss as a rate limit threshold is exceeded. The transparent transmission means that, since the attacker may control a large number of abnormal clients with different IP addresses to launch attacks, even if rate limit is imposed on each abnormal client, abnormal traffic after rate limit is still very large, which results in that abnormal traffic may still cause actual damage to the server.

Therefore, in the related art, when a server is attacked by abnormal traffic, the attack on the server is reduced by the rate limit of the traffic of each client, but this method will cause accidental harm to normal traffic. If the number of abnormal clients is large and abnormal traffic is still large, there might be the risk of transparent transmission, that is, abnormal traffic will still cause actual damage to the server.

In addition, it is usually necessary to manually configure a rate limit policy on the traffic based on actual service scenarios, for example, rate limit is imposed based on the source IP, or rate limit is imposed based on the geographical location of the source, or the QUIC service of the server is directly closed, so that the protection efficiency is low and the labor cost is large.

In view of this, the embodiments of the present disclosure provide a traffic processing method and apparatus, a medium and an electronic device. The embodiments of the present disclosure will be further explained below in conjunction with the accompanying drawings.

FIG. 1 is an architecture diagram of a system for implementing a traffic processing method shown according to an exemplary embodiment of the present disclosure. Referring to FIG. 1, the system may comprise a protection device, an optical splitter, a core switch and an access switch. The protection device may comprise a detection module and a protection module, wherein the protection module may comprise a first protection module, a second protection module and a control center. Internet Service Provider (referred to as ISP) is responsible for providing a network access service to a client. An optical splitter is deployed between the ISP network and the core switch so that the optical splitter replicates the incoming traffic initiated by the client and flowing to the server to obtain mirror traffic and forward the mirror traffic to the detection module, so as to realize self-learning of an attack threshold and detection of a DDoS attack. The detection module performs analysis based on the mirror traffic to determine whether the server is attacked by a distributed denial of service (DDoS), and sends alarm information and traffic data to a control center in response to determining that the server is attacked by the distributed denial of service (DDoS); and after receiving the alarm information, the control center will issue a protection instruction of the server corresponding to the traffic data to the protection module. After receiving the protection instruction, the protection module leads the incoming traffic of the server attacked by DDoS to the protection module by announcing a 32-bit BGP (Border Gateway Protocol) route, and intercepts the detected abnormal traffic, so that the intercepted abnormal traffic will not be sent to the server, so as to avoid server crash resulting from the server processing a large number of abnormal traffic; and the detected normal traffic will be reinjected to the server for processing through the access switch, so that the server may successfully respond to a normal service request of a normal client.

Figure 2:
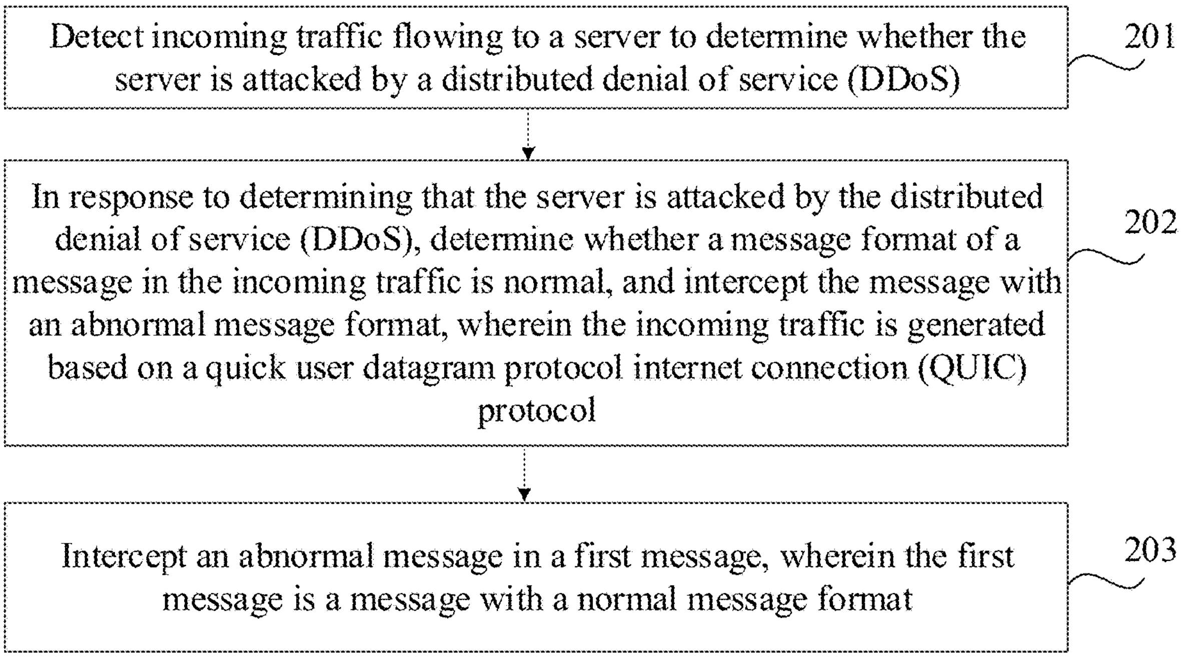
FIG. 2 is a flowchart of a traffic processing method shown according to an exemplary embodiment of the present disclosure.

FIG. 2 is a flowchart of a traffic processing method shown according to an exemplary embodiment of the present disclosure. The traffic processing method may be performed by the protection device described in FIG. 1. Referring to FIG. 2, the traffic processing method may comprise steps 201 to 203.

In step 201, incoming traffic flowing to a server is detected to determine whether the server is attacked by a distributed denial of service (DDoS).

The incoming traffic refers to traffic flowing to a server that provides a service to the outside.

For example, the detection module performs mirroring based on the incoming traffic flowing to the server in advance to obtain mirror traffic, and with each server as a statistical object, count a packet total of the port 443 of each server per second in a preset time period, and calculate an average value based on a statistical result, and take a product of the average value and a fixed coefficient as an attack threshold of whether the server is attacked by a distributed denial of service (DDoS). The fixed coefficient here may be manually configured.

On such basis, in practical application, the detection module detects mirror traffic obtained by performing mirroring on the incoming traffic flowing to the server, counts a real-time packet total of the port 443 of the server in real time, determines that the server is attacked by the distributed denial of service (DDoS) in response to the real-time packet total exceeding the attack threshold, in contrast, determines that the server is not attacked by the distributed denial of service (DDoS) in response to the real-time packet total not exceeding the attack threshold.

Therefore, in some embodiments, the step 201 comprises: detecting mirror traffic obtained by performing mirroring on the incoming traffic flowing to the server to count a real-time packet total of a port 443 of the server in real time, wherein the port 443 is a port used by the QUIC protocol; determining that the server is attacked by the distributed denial of service (DDoS) in response to the real-time packet total being greater than an attack threshold; and determining that the server is not attacked by the distributed denial of service (DDoS) in response to the real-time packet total being less than or equal to the attack threshold.

In step 202, in response to determining that the server is attacked by the distributed denial of service (DDoS), it is determined whether a message format of a message in the incoming traffic is normal, and the message with an abnormal message format is intercepted, wherein the incoming traffic is generated based on a quick user datagram protocol internet connection (QUIC) protocol.

For the specific implementation of the step 202, reference may be made to the related embodiments hereinafter, and this embodiment will not be described in detail here.

In step 203, an abnormal message in a first message is intercepted, wherein the first message is a message with a normal message format.

For the specific implementation of the step 203, reference may be made to the related embodiments hereinafter, and this embodiment will not be described in detail here.

By way of the above-described method, in view of the traffic of the quick user datagram protocol internet connection (QUIC) protocol, in response to the server being attacked by the distributed denial of service (DDoS), the detected message with the abnormal message format is intercepted, and the message with the normal message format is further detected, and the abnormal message in the message with the normal message format is intercepted, thereby avoiding abnormal traffic flowing into the server to cause server downtime and improving the stability of the server.

It is worthwhile to be noted that the normal message in the first message may be reinjected to the server for processing, so as to implement processing normal traffic by the server.

In some embodiments, the above-described step 202 comprises: determining a second message with a message header that is a short header data packet in the incoming traffic in response to determining that the server is attacked by the distributed denial of service (DDoS); determining that the message format of the second message is abnormal and discarding the second message in response to a length of a user datagram protocol (UDP) load of the second message being less than a length corresponding to a first preset byte; and determining that the message format of the second message is normal in response to the length of the UDP load of the second message being greater than or equal to the length corresponding to the first preset byte.

For example, the first preset byte is 24 bytes. A structure of the short header data packet determines that the length of the UDP load is greater than or equal to a length corresponding to 24 bytes. Therefore, in response to the length of the UDP load of the second message being less than the length corresponding to 24 bytes, it is determined that the message format of the second message is abnormal, and the second message is discarded to implement the interception of the abnormal traffic.

In some embodiments, the above-described Step 202 comprises: determining a third message with a message header that is a long header data packet in the incoming traffic in response to determining that the server is attacked by the distributed denial of service (DDoS); and determining that the message format of the third message is abnormal and discarding the third message in response to a length of a user datagram protocol (UDP) load of the third message being less than a length corresponding to a second preset byte.

For example, the second preset byte is 48 bytes. A structure of the long header data packet determines that the length of the UDP load is greater than or equal to a length corresponding to 48 bytes. Therefore, in response to the length of the UDP load of the third message being less than the length corresponding to 48 bytes, it is determined that the message format of the third message is abnormal and the third message is discarded to implement the interception of the abnormal traffic.

In addition, for the specific implementation of determining whether the message in the traffic is a short header data packet or a long header data packet, reference may be made to the related embodiments hereinafter.

In some embodiments, in response to the length of the UDP load of the third message being greater than or equal to the length corresponding to the second preset byte, it is possible to further determine whether the message format of the message is normal by combining the message type of the third message. For example, the message type comprises initial, 0-RTT, handshake and Retry.

For example, the above-described step 202 further comprises: determining whether the third message is an initial message in response to the length of the UDP load of the third message being greater than or equal to the length corresponding to the second preset byte; determining that the message format of the third message is abnormal and discarding the third message in response to the third message being the initial message and the length of the UDP load of the third message being less than a length corresponding to a third preset byte; determining that the message format of the third message is normal in response to the third message being not the initial message and the length of the UDP load of the third message being greater than or equal to the length corresponding to the second preset byte; and determining that the message format of the third message is normal in response to determining that the third message is the initial message and the length of the UDP load of the third message is greater than or equal to the length corresponding to the third preset byte.

The second preset byte is less than the third preset byte. For example, the third preset byte is 1200 bytes.

It is worthwhile to be noted that the initial message is a message with a message type of initial, and the initial message is configured to request for establishing connection by a target client initiating the initial message. Moreover, for the initial message, in order to avoid the limitation of a reflection amplification attack, it is required that the length of the UDP load of the initial message needs to be greater than a length corresponding to 1200 bytes.

Therefore, in response to the third message being the initial message and the length of the UDP load of the third message being less than the length corresponding to the third preset byte, it is determined that the message format of the third message is abnormal, and the third message is discarded to implement the interception of the abnormal traffic.

For the implementation of determining whether the third message is the initial message, reference may be made to the related embodiments hereinafter.

Figure 3:
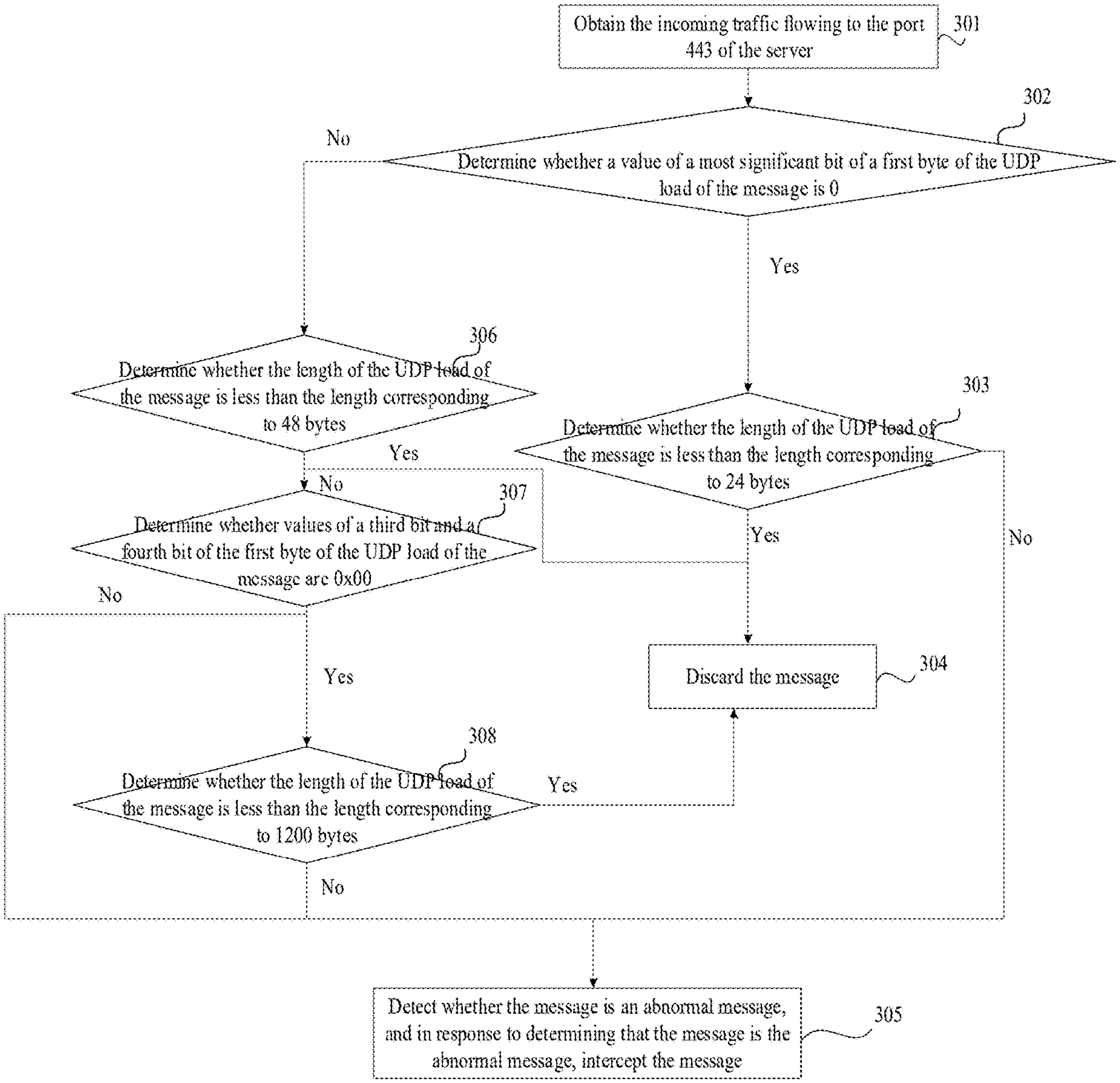
FIG. 3 is a flowchart of step 202 shown according to an exemplary embodiment of the present disclosure.

FIG. 3 is a flowchart of step 202 shown according to an exemplary embodiment of the present disclosure. Referring to FIG. 3, the step 202 comprises the following steps 301 to 308.

In step 301, the incoming traffic flowing to the port 443 of the server is obtained.

Step 301 is actually the process of leading the incoming traffic in FIG. 1. That is, in response to determining that the server is attacked by the distributed denial of service (DDoS), it may obtain the incoming traffic flowing to the port 443 of the server and intercept the abnormal traffic in the incoming traffic.

In step 302, it is determined whether a value of a most significant bit of a first byte of the UDP load of the message is 0.

Step S303 is actually a process of determining whether the message header of the message is a long header data packet or a short header data packet, that is, a process of determining the second message with the message header that is the short header data packet in the incoming traffic and determining the third message with the message header that is the long header data packet in the incoming traffic.

One byte comprises eight bits, and a position of each bit may be represented by a mask, and the most significant bit may also be understood as a bit of a mask 0x80.

In response to determining that the value of the most significant bit of the first byte of the UDP load of the message is 0, the message is determined to be the second message, and step 303 is performed to determine whether the length of the UDP load of the message is less than the length corresponding to 24 bytes.

For a message with a message header that is a short header data packet, if the length of the UDP load of the message is less than the length corresponding to 24 bytes, the message format of the message is determined to be abnormal, and the message is discarded; if the length of the UDP load of the message is greater than or equal to the length corresponding to 24 bytes, the message format of the message is determined to be normal, and step 305 is performed to detect whether the message is an abnormal message, and in response to determining that the message is the abnormal message, the message is intercepted. It is worthwhile to be noted that the message detected in step 305 is a message with a normal message format, and step 305 uses another method different from message format detection to determine whether the message is normal, and for the implementation of step 305, reference may be made to the implementation of step 203, and the embodiment will not be described in detail here.

In response to determining that the value of the most significant bit of the first byte of the UDP load of the message is not 0, the message is determined to be the third message, and step 306 is performed to determine whether the length of the UDP load of the message is less than the length corresponding to the second preset byte. Further, in response to determining that the value of the most significant bit of the first byte of the UDP load of the message is 1, the message is determined to be the third message.

For a message with a message header that is a long header data packet, if the length of the UDP load of the message is less than the length corresponding to 48 bytes, the message format of the message is determined to be abnormal, and the message is discarded; if the length of the UDP load of the message is greater than or equal to 48 bytes, step 307 is performed to determine whether values of a third bit and a fourth bit of the first byte of the UDP load of the message are 0x00.

Step 307 is one embodiment of determining whether the message is an initial message. Specifically, whether the message is an initial message is determined by identifying the values of the third bit and the fourth bit of the byte.

As mentioned previously, different bits in a byte may be represented by a mask, so that the third bit and the fourth bit of the byte may also be understood as bits with a mask of 0x030.

In response to the values of the third bit and the fourth bit of the first byte of the UDP load of the message being not 0x00, the message is determined to be not the initial message, and step 305 is continued.

In response to the values of the third bit and the fourth bit of the first byte of the UDP load of the message being 0x00, the message is determined to be the initial message, and step 308 is performed to determine whether the length of the UDP load of the message is less than the length corresponding to 1200 bytes.

In response to the length of the UDP load of the message being less than the length corresponding to 1200 bytes, the message format of the message is determined to be abnormal, and step 304 is performed.

In response to the length of the UDP load of the message being greater than or equal to the length corresponding to 1200 bytes, the message format of the message is determined to be normal, and step 305 is performed.

In response to the values of the third bit and the fourth bit of the first byte of the UDP load of the message being not 0x00, the message is determined to be not the initial message, and since step 307 is performed in response to the length of the UDP load of the third message being greater than or equal to the length corresponding to the second preset byte, the message format of the third message may be determined to be normal, and step 305 is performed.

In some embodiments, the intercepting of the abnormal message in the first message comprises: obtaining, for the first message, a message type of the first message; and intercepting the abnormal massage in the first message according to a protection policy corresponding to the message type of the first message.

For example, the protection policy comprises a first protection sub-policy and a second protection sub-policy. For the first message with different message types, a QUIC back challenge algorithm policy or a QUIC action detection policy corresponding to a message type of the first message can be used to intercept the abnormal message in the first message. The first protection sub-policy here corresponds to the QUIC back challenge algorithm policy, and the second protection sub-policy here corresponds to the QUIC action detection policy.

Figure 4:
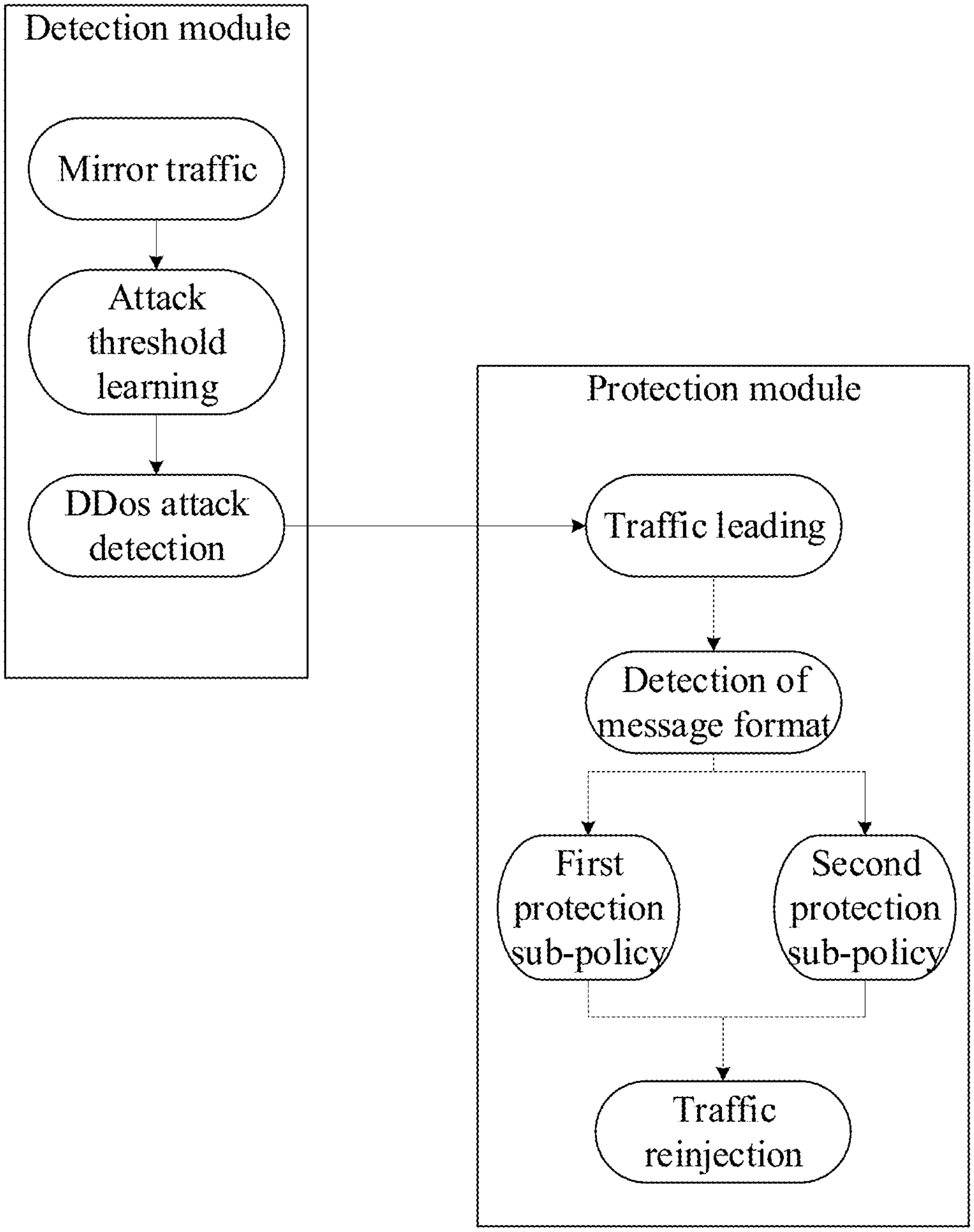
FIG. 4 is a schematic view of protective logic of a traffic processing method shown according to an exemplary embodiment of the present disclosure.

Referring to the protective logic shown in FIG. 4, when the detection module detects that the server is attacked by DDoS, the traffic sent to the port 443 of the server will be led to the protection module. The protection module first detects the message format of the message to intercept the message with an abnormal message format, and then intercepts, a forged message with a normal message format, an abnormal message in the forged message with the normal message format based on the first protection sub-policy or the second protection sub-policy; normal traffic is reinjected, so that the server can process normal traffic normally. It is worthwhile to be noted that, for the embodiment of detecting the message format in FIG. 4, reference may be made to the embodiment of the above-described step 202, and the embodiment will not be described in detail here.

By way of the above-described method, the forged message with the normal message format may still be abnormal traffic, because in order to further intercept the abnormal message, the protection policy corresponding to the message type of the first message is used to intercept the abnormal message in the first message. Considering different message types, the present disclosure provides protection policies for different message types to intercept the abnormal message in the first message, so as to enhance the practicability of the solution and effectively improve the protection effect on abnormal traffic.

The specific selection of the first protection sub-policy or the second protection sub-policy needs to be determined according to the message type of the first message, and explanation will be made below for selecting different protection sub-policies according to different message types.

First of all, the message type may be divided into a message type of an initial message and a message type of a non-initial message, wherein the non-initial message may be, for example, a message with the message type of 0-RTT and a message with the message type of handshake described above, and so on. For the initial message, the QUIC back challenge algorithm policy is used to intercept the abnormal message. The reason lies in that in the data transmission based on the QUIC protocol, a packet num mechanism of the QUIC protocol determines that the protection device cannot replace the server to return the response message to the client. Otherwise, a packet num space of the client will be inconsistent with a packet num space of the server, so that the whole QUIC session can only be interrupted for reconnection. Since the initial message is the first message established for the QUIC session, even if the protection system replaces the server to return the response message to the client, it also only allows the client to resend the initial message and retry establishing connection, so that there is a minor impact on the client. Therefore, for the initial message, the back challenge algorithm may be used to intercept the abnormal message in the first message. The back challenge algorithm will be illustratively described below.

The step of intercepting the abnormal message in the first message according to a protection policy corresponding to a message type of the first message may be implemented by the following back challenge algorithm: for an initial message in the first message, sending, instead of the server, a response message to a target client corresponding to the initial message; receiving the initial message resent by the target client and verifying whether the initial message resent by the target client carries a random character; and in response to the initial message resent by the target client not carrying the random character, returning to the sending, instead of the server, the response message to the target client corresponding to the initial message to intercept an abnormal message in the message with the normal message format.

The initial message is configured to request for establishing connection by the target client, the response message carries a random character. The random character may be realized based on a random number generation algorithm, that is, a Hash value corresponding to a given source value for a message is generated based on the given source value for the message, wherein the Hash value may be used as a random character. For example, the source value may be configured by a five-tuple and a preset value corresponding to the message, wherein the preset value may be configured according to actual conditions. In addition, for the explanation of the five-tuple, reference may be made to the related embodiments hereinafter.

It is worthwhile to be noted that, the abnormal client does not process the response message, that is, the initial message resent by the abnormal client does not carry the random character generated by the server, while the normal client processes the response message, that is, the initial message resent by the normal client carries the random character generated by the server, so that whether the target client is a normal client may be determined based on whether the initial message resent by the target client carries the random character.

Figure 5:
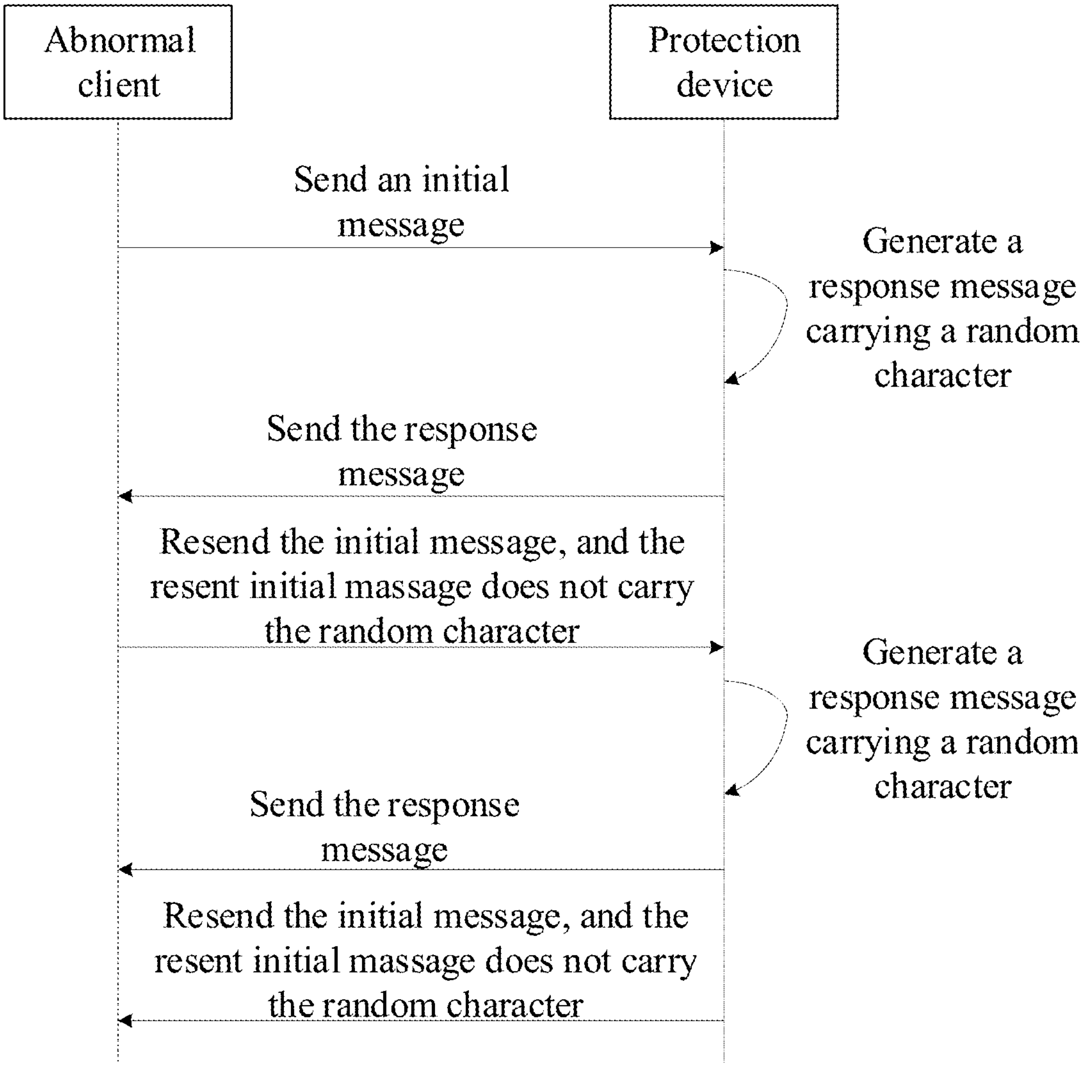
FIG. 5 is an interaction diagram of an abnormal client receiving a response message shown according to an exemplary embodiment of the present disclosure.

FIG. 5 is an interaction diagram of an abnormal client receiving a response message shown according to an exemplary embodiment of the present disclosure. Referring to FIG. 5, the protection device generates a response message carrying a random character for the initial message sent by the abnormal client. Since connection is not established, the abnormal client resends the initial message for connection on a try, and the resent initial message does not carry the random character. For the newly received initial message, in response to verifying that the initial message does not carry the random character, the protection device continues to send a response message carrying the random character to the abnormal client, and so forth, so that abnormal traffic is intercepted by the protection device, so as to avoid the abnormal traffic reaching the server.

It is worthwhile to be noted that, since whether the message format is normal may be first detected on the initial message resent by the abnormal client, in response to detecting that the message format of the resent initial message is abnormal, it is directly intercepted without detection by using the protection policy corresponding to the initial message.

However, since the initial message sent by the abnormal client before the initial message is resent is a forged message with a normal message format, after that, subsequent messages sent by the abnormal client might all be forged messages with a normal message format. Therefore, in another embodiment, for the re-received initial message sent by the target client, it is directly verified whether the initial message carries the random character, thus eliminating the need to detect whether the message format is normal.

By way of the above-described method, abnormal traffic can be identified by using the back challenge algorithm without uploading a key to the protection device, and only the initial message is intercepted by using the back challenge algorithm, so as to reduce the impact on the client.

In some embodiments, the protection device may count the number of times the response message is sent to the same client. For example, after the number of times of sending the response message to the client A reach a preset number of times, the protection device may stop sending the response message to the client A instead of the server, so as to reduce the resource consumption of the protection device. However, in the embodiment, since the traffic of the client A is also fails to pass the verification with the random character, the traffic of the client A is not reinjected to the server, so as to intercept the abnormal traffic initiated by the client A. In some embodiments, in response to the initial message resent by the target client carrying the random character, the target client is added to a trust list, and an interrupting connection message is sent to the target client.

Figure 6:
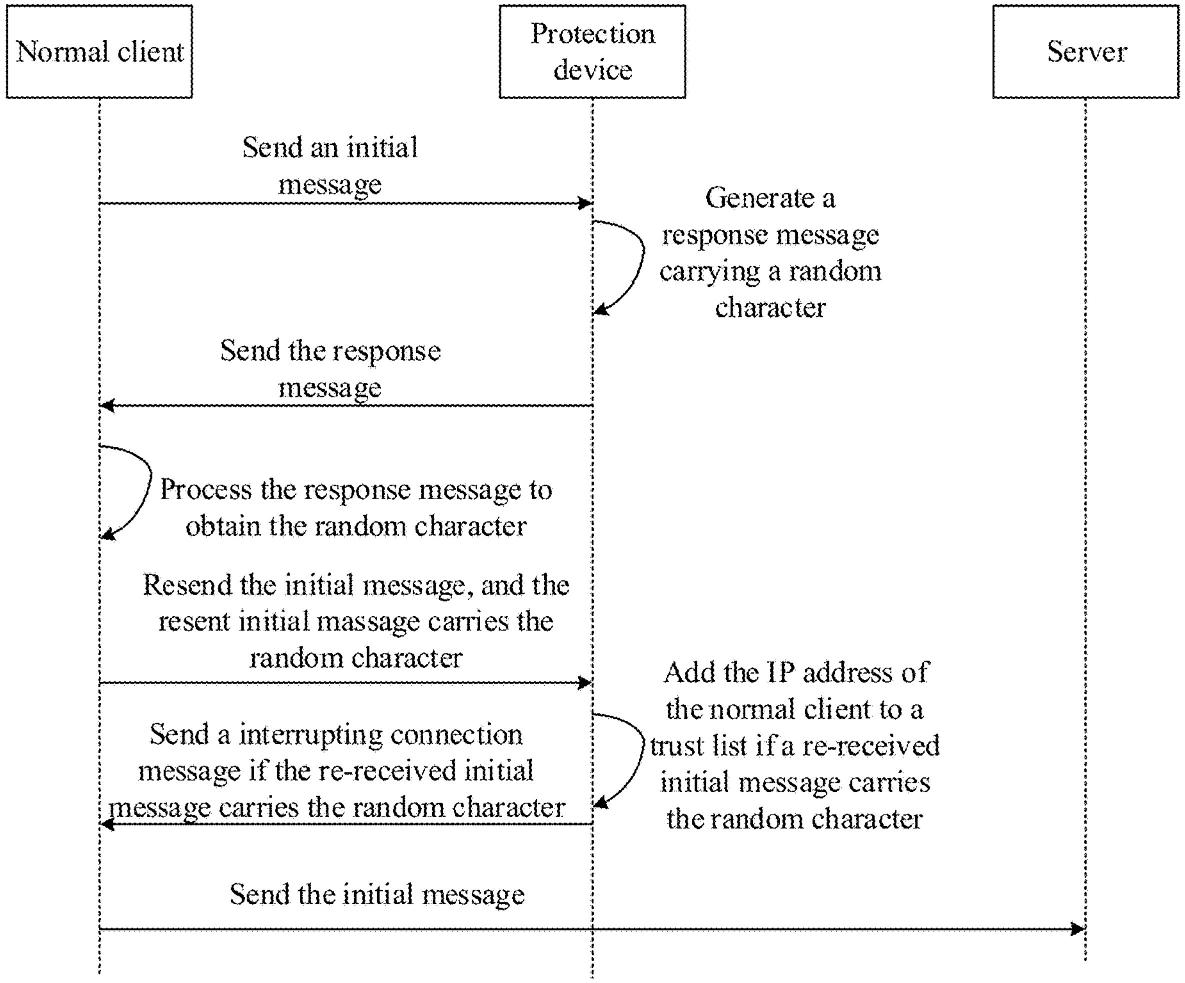
FIG. 6 is an interaction diagram of a normal client receiving a response message shown according to an exemplary embodiment of the present disclosure.

FIG. 6 is an interaction diagram of a normal client receiving a response message shown according to an exemplary embodiment of the present disclosure. Referring to FIG. 6, after receiving the initial message sent by the normal client for the first time, the protection device, instead of the server, replies the response message to the normal client, the response message carrying the random character, and the protection device sends the response message carrying the random character to the normal client. After receiving the response message, the normal client processes the response message to obtain the random character, and resends the initial message to the protection device, wherein the resent initial message carries the random character. After receiving the initial message resent by the normal client, the protection device verifies whether the initial message carries the random character. If the re-received initial message carries the random character, the protection device adds an IP address of the normal client to the trust list and sends an interrupting connection message to the normal client. After receiving the interrupting connection message, the normal client interrupts the connection established with the protection device this time and resends the initial message, and the IP address of the client corresponding to the initial message is in the trust list, so the initial message directly reaches the server.

It is worthwhile to be noted that, since the initial message resent by the target client establishes connection between the protection device and the normal client, in order to establish connection between the normal client and the server, the protection device needs to send the interrupting connection message to the normal client, so as to interrupt the connection between the target client and the protection device.

It is worthwhile to be noted that, after the normal client interrupts the connection established with the protection device, since the message generated by the client added in the trust list is directly sent to the server, the initial message sent by the normal client after receiving the interrupting connection message directly reaches the server without detecting whether the message format is normal and a corresponding protection policy, thereby reducing the resource occupation of the protection device, and accomplishing session connection between the normal client and the server.

For example, the trust list is stored in the protection device. In addition, a effective duration of adding the IP address of the client to the trust list may be set, so that the IP address of the client may be deleted from the trust list after a duration of adding the IP address of the client to the trust list exceeds a corresponding effective duration. In this way, the storage pressure of the protection device can be reduced.

As mentioned previously, the abnormal client may be successfully distinguished from the normal client by using the back challenge algorithm, so that the traffic initiated by the abnormal client may be intercepted, while the normal traffic initiated by the normal client may be processed by the server. However, in order to reduce the impact on the client, the back challenge algorithm is only directed to the initial message. Therefore, in some embodiments, for the non-initial message, the above-described step of intercepting the abnormal message in the first message according to a protection policy corresponding to a message type of the first message may be implemented in the following way: determining a message carrying a target session identifier from a non-initial message in the first message, and discarding the message carrying the target session identifier.

For the message type as shown previously, the non-initial message may be, for example, the message with the message type of 0-RTT and the message with the message type of handshake described above, and so on.

A number of times that the target session identifier appears in a session within a first preset time reaches a first preset number of times, wherein the first preset time and the first preset number of times may be set according to actual conditions, for example, the first preset number of times may be five times, that is, if a session identifier appears in five sessions within the first preset time, it means that the session identifier is the target session identifier.

The session identifier is CID (connection ID). In the QUIC protocol, the server uses different CIDs for different sessions, and messages belonging to different sessions use different CIDs, while messages belonging to a same session use a same CID. Therefore, if the same CID appears in a plurality of different sessions in a short time, it can mean that the CID is forged, and a message corresponding to the CID may also be determined to be an abnormal message.

For example, the message carrying a target session identifier may be determined from the non-initial message in the first message by the following way: obtaining five-tuple information corresponding to the non-initial message in the first message, and determining the message carrying the target session identifier from the non-initial message in the first message according to the five-tuple information.

The five-tuple information comprises, for example, a source IP address, a source port, a target IP address, a target port and a protocol type. The protocol type and the target port are configured to identify whether the message is a QUIC message based on the QUIC protocol. The source IP address is the IP address corresponding to the client, and the target IP address is the IP address corresponding to the server. If any of the source IP and the source port is different, it can mean that the sessions are different.

Referring to Table 1 below, Table 1 shows the five-tuple information of five messages and the CIDs corresponding to the messages within the first preset time.

TABLE 1

| Srcip | Srcport | Dstip | Dstport | Protocol | CID |
|---|---|---|---|---|---|
| 1.1.1.1 | 1234 | 2.2.2.2 | 443 | UDP | 4e2bc9dcc7a37 |
| 1.1.1.2 | 1234 | 2.2.2.2 | 443 | UDP | 4e2bc9dcc7a37 |
| 1.1.1.2 | 2455 | 2.2.2.2 | 443 | UDP | 4e2bc9dcc7a37 |
| 1.1.1.3 | 2411 | 2.2.2.2 | 443 | UDP | 4e2bc9dcc7a37 |
| 1.1.1.3 | 12345 | 2.2.2.2 | 443 | UDP | 4e2bc9dcc7a37 |

In Table 1 above, Srcip represents the source IP address, Srcport represents the source port, Dstip represents the IP address of the server, Dstport represents the port of the server, and Protocol represents the protocol type. As may be known from the IP address of the server, the port of the server and the protocol type in Table 1, the above-described five messages are QUIC messages sent to the port 443 of the server. Moreover, at least one of the source ports and the source IP addresses in the above-described five messages is different, so that it may be determined that the above-described five messages are QUIC messages in different sessions, but the CIDs corresponding to the five sessions are the same, which indicates that the CID is a target session identifier, and the message carrying the CID can be determined to be the abnormal message.

By way of the above-described method, the abnormal message can be determined based on the distribution condition of the session identifier corresponding to the message, and the abnormal message is discarded, so as to intercept the abnormal traffic. Moreover, CID is data pertaining to cleartext transmission, so that the purpose of intercepting the abnormal traffic without a key can be achieved.

In some embodiments, for the non-initial message, the above-described step of intercepting the abnormal message in the first message according to the protection policy corresponding to the message type of the first message is implemented by the following way: determining the message carrying a target effective load from a non-initial message in the first message, and discarding the message carrying the target effective load.

The components of the message are briefly shown in Table 2 below:

TABLE 2

| IP header | UDP header | QUIC long/short packet header | QUIC effective load |
|---|---|---|---|

The IP header in Table 2 may comprise fields such as Srcip, Dstip and Protocol in Table 1 above, the QUIC long/short packet header in Table 2 may comprise fields such as CID in Table 1 above, the UDP header in Table 2 may comprise fields such as Srcport and Dstport in Table 1 above, and the QUIC long/short packet header and the QUIC effective load may be collectively referred to as a data load. It is worthwhile to be noted that, an effective load carried by the message based on QUIC may be referred to as a QUIC effective load.

The target effective load is an effective load with a number of times that the effective load appears among all effective loads within a second preset time reaching a second preset number of times, wherein the second preset time and the second preset number of times may be set according to actual conditions, for example, the second preset number of times may be 100 times. If an effective load with the number of times that the effective load appears among all effective loads within the second preset time reaches 100 times, it means that the effective load is the target effective load. It may be understood that, all the effective loads within the second preset time may be equivalent to all the messages within the second preset time. The message here may be, for example, the first message.

It is worthwhile to be noted that, the protection system cannot decrypt the QUIC effective load without a key, so that it is impossible to verify whether the corresponding message carrying the QUIC effective load is a normal message based on the data. However, since the QUIC effective load is obtained by random encryption, it is inevitable to vary randomly so that the same effective load can not appear repeatedly in a short time. If a same effective load appears for too many times in a short time, it can be proved that the effective load is forged by an abnormal client.

Therefore, if it is detected that the number of times that the same effective appears load among all the effective loads in a short time reaches the second preset number of times, the effective load may be determined to be the target effective load, and the message corresponding to the target effective load may also be determined to be an abnormal message, and the determined abnormal message is discarded, so that the purpose of intercepting the abnormal traffic without a key can be achieved.

In addition, in order to reduce the calculation of the protection device, whether it is the same effective load may be determined according to whether data corresponding to a fixed byte position of the effective load is the same, that is, first preset bytes of target effective loads are the same, last preset bytes of the target effective loads are the same, and the target effective load is the effective load with the number of times that the effective load appears among all effective loads within the second preset time reaching the second preset number of times.

Figure 7:
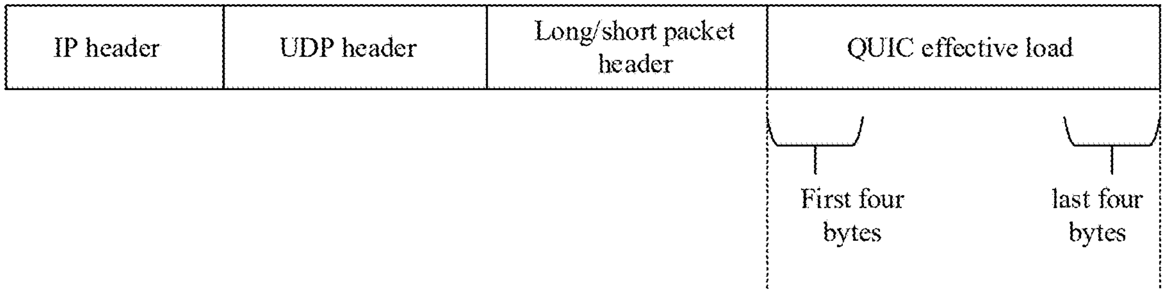
FIG. 7 is a schematic view showing components of a message shown according to an exemplary embodiment of the present disclosure.

For example, referring to FIG. 7, the preset byte is 4 bytes. If the number of times that the QUIC effective load with the same first four bytes and the same last four bytes appears among all the QUIC effective loads in the second preset time reaches the second preset number of times, the QUIC effective load is the target effective load.

In some embodiments, for the non-initial message with a normal message format, the abnormal message in the forged message with a normal message format is intercepted by using the embodiments related to Table 1 and Table 2.

Figure 8:
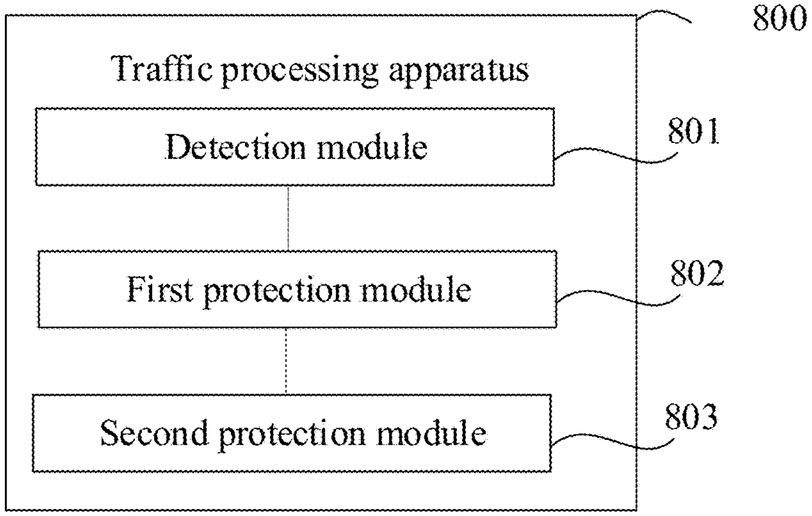
FIG. 8 is a block diagram of a traffic processing apparatus shown according to an exemplary embodiment of the present disclosure.

Based on the same inventive concept, the embodiment of the present disclosure also provides a traffic processing apparatus. FIG. 8 is a block diagram of a traffic processing apparatus shown according to an exemplary embodiment of the present disclosure. Referring to FIG. 8, the apparatus 800 comprises: a detection module 801, a first protection module 802 and a second protection module 803.

The detection module 801 is configured to detect incoming traffic flowing to a server to determine whether the server is attacked by a distributed denial of service (DDoS).

The first protection module 802 is configured to, in response to determining that the server is attacked by the distributed denial of service (DDoS), determine whether a message format of a message in the incoming traffic is normal, and intercept the message with an abnormal message format, wherein the incoming traffic is generated based on a quick user datagram protocol internet connection (QUIC) protocol.

The second protection module 803 is configured to intercept an abnormal message in a first message, wherein the first message is a message with a normal message format.

In some embodiments, the first protection module 802 comprises: a first determining sub-module configured to determine a second message with a message header that is a short header data packet in the incoming traffic in response to determining that the server is attacked by the distributed denial of service (DDoS); a second determining sub-module configured to determine that the message format of the second message is abnormal and discard the second message in response to a length of a user datagram protocol (UDP) load of the second message being less than a length corresponding to a first preset byte; and a third determining sub-module configured to determine that the message format of the second message is normal in response to the length of the UDP load of the second message being greater than or equal to the length corresponding to the first preset byte.

In some embodiments, the first protection module 802 comprises: a fourth determining sub-module configured to determine a third message with a message header that is a long header data packet in the incoming traffic in response to determining that the server is attacked by the distributed denial of service (DDoS); and a fifth determining sub-module configured to determine that the message format of the third message is abnormal and discard the third message in response to a length of a UDP load of the third message being less than a length corresponding to a second preset byte.

In some embodiments, the first protection module 802 further comprises: a sixth determining sub-module configured to determine whether the third message is an initial message in response to the length of the UDP load of the third message being greater than or equal to the length corresponding to the second preset byte, wherein the initial message is configured to request for establishing connection by a target client initiating the initial message; and a seventh determining sub-module configured to determine that the message format of the third message is abnormal and discard the third message in response to the third message being the initial message and the length of the UDP load of the third message being less than a length corresponding to a third preset byte, wherein the second preset byte is less than the third preset byte.

In some embodiments, the first protection module 802 further comprises: an eighth determination sub-module configured to determine that the message format of the third message is normal in response to the third message being not the initial message and the length of the UDP load of the third message being greater than or equal to the length corresponding to the second preset byte; and a ninth determining sub-module configured to determine that the message format of the third message is normal in response to determining that the third message is the initial message and the length of the UDP load of the third message is greater than or equal to the length corresponding to the third preset byte.

In some embodiments, the second protection module 803 comprises: a first obtaining sub-module configured to obtain, for the first message, a message type of the first message; and a first interception sub-module configured to intercept the abnormal massage in the first message according to a protection policy corresponding to the message type of the first message.

In some embodiments, the first interception sub-module is configured to: for an initial message in the first message, send, instead of the server, a response message to a target client corresponding to the initial message, wherein the initial message is configured to request for establishing connection by the target client, the response message carries a random character and is configured to instruct the target client to resend the initial message, and the initial message resent by an abnormal client does not carry the random character, and the initial message resent by a normal client carries the random character; receive the initial message resent by the target client and verify whether the initial message resent by the target client carries the random character; and in response to the initial message resent by the target client not carrying the random character, return to the sending, instead of the server, the response message to the target client corresponding to the initial message to intercept an abnormal message in the message with the normal message format.

In some embodiments, the apparatus 800 further comprises: a sending module configured to, in response to the initial message resent by the target client carrying the random character, add the target client to a trust list, and send an interrupting connection message to the target client, wherein the interrupting connection message is configured to interrupt connection between the target client and the protection device, and the message generated by a client added to the trust list is directly sent to the server.

In some embodiments, the second protection module 803 further comprises: a tenth determining sub-module configured to determine the message carrying a target session identifier from a non-initial message in the first message, wherein in the QUIC protocol, messages belonging to different sessions use different session identifiers, and a number of times that the target session identifier appears in a session within a first preset time reaches a first preset number of times; and a second interception sub-module configured to discard the message carrying the target session identifier.

In some embodiments, the tenth determining sub-module configured to obtain five-tuple information corresponding to the non-initial message in the first message, and determine the message carrying the target session identifier from the non-initial message in the first message according to the five-tuple information, wherein the five-tuple information comprises a source internet protocol (IP) address, a source port, a target IP address, a target port and a protocol type.

In some embodiments, the second protection module 803 further comprises: an eleventh determining sub-module configured to determine the message carrying a target effective load from a non-initial message in the first message, wherein the target effective load is an effective load with a number of times that the effective load appears among all effective loads within a second preset time reaching a second preset number of times; and a third interception sub-module configured to discard the message carrying the target effective load.

In some embodiments, first preset bytes of target effective loads are the same, last preset bytes of the target effective loads are the same, and the target effective load is the effective load with the number of times that the effective load appears among all effective loads within the second preset time reaching the second preset number of times.

In some embodiments, the detection module 801 is configured to detect mirror traffic obtained by performing mirroring on the incoming traffic flowing to the server to count a real-time packet total of a port 443 of the server in real time, determine that the server is attacked by the distributed denial of service (DDoS) in response to the real-time packet total being greater than an attack threshold, and determine that the server is not attacked by the distributed denial of service (DDoS) in response to the real-time packet total being less than or equal to the attack threshold, wherein the port 443 is a port used by the QUIC protocol.

For the implementation of each module in the above-described device 800, reference may be made to the above-described method embodiment, and the embodiment will not be described in detail here.

Based on the same inventive concept, the embodiment of the present disclosure provides a computer-readable medium having a computer program stored thereon that, when executed by a processing device, implements the above-described traffic processing method.

Based on the same inventive concept, the embodiment of the present disclosure provides an electronic device, comprising: a storage device having a computer program stored thereon; a processing device configured to execute the computer program in the storage device to implement the above-described traffic processing method.

Figure 9:
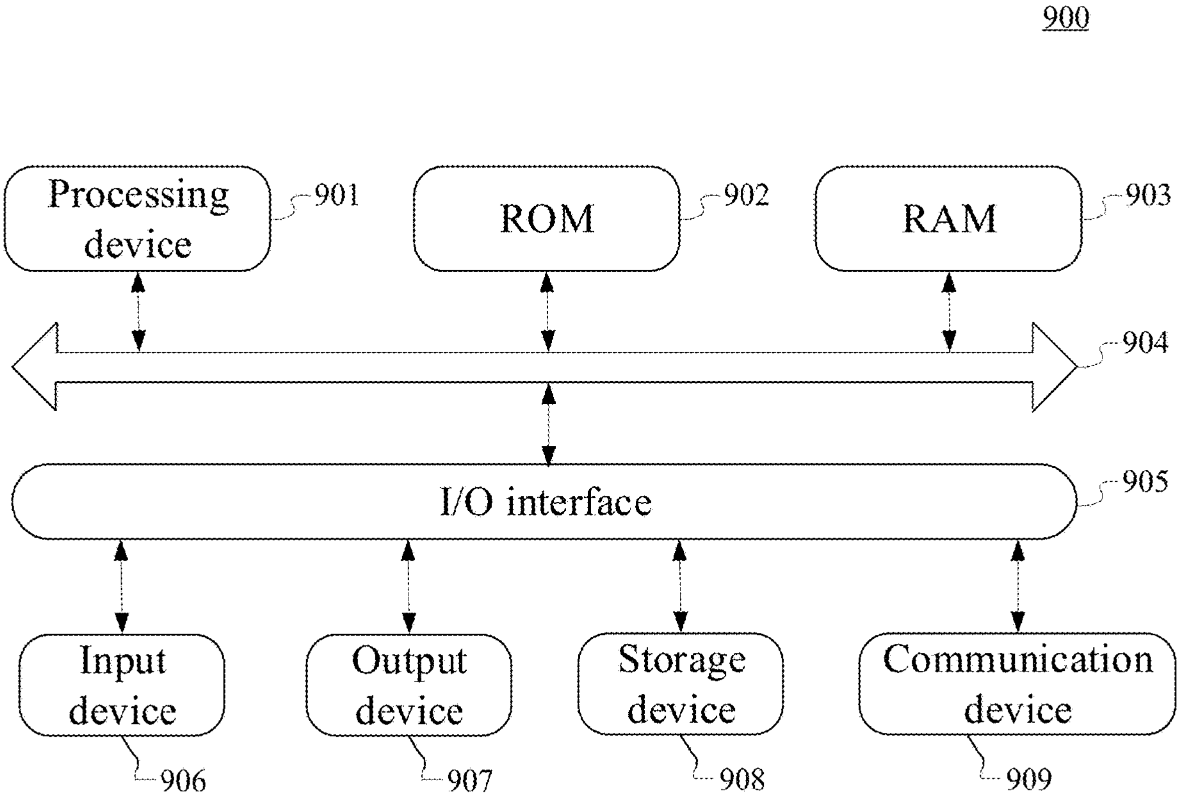
FIG. 9 is a block diagram of an electronic device shown according to an exemplary embodiment of the present disclosure.

Next, referring to FIG. 9, it shows a structural schematic view of an electronic device 900 (for example, a protection device, a server or a client described above) suitable for implementing the embodiment of the present disclosure. The electronic device in an embodiment of the present disclosure may comprise, but is not limited to, a mobile terminal such as a mobile phone, a notebook computer, a digital broadcast receiver, a PDA (personal digital assistant), a PAD (tablet computer), a PMP (Portable Multimedia Player) and an in-vehicle terminal (for example, an in-vehicle navigation terminal); and a fixed terminal such as a digital TV, a desktop computer and the like. The electronic device shown in FIG. 9 which is only an example, shall not limit the functions and application range of the embodiments of the present disclosure.

As shown in FIG. 9, the electronic device 900 may comprise a processing device (for example, a central processing unit, a graphic processor, or the like) 901, which may perform various suitable actions and processing according to a program stored in a Read-only Memory (ROM) 902 or a program loaded from a storage device 908 into a Random Access Memory (RAM) 903. In the RAM 903, various programs and data required for the operation of the electronic device 900 are also stored. The processing device 901, the ROM 902 and the RAM 903 are connected to each other through a bus 904. The input/output (I/O) interface 905 is also connected to the bus 904.

Generally, the following devices may be connected to the I/O interface 905: an input device 906 comprising, for example, a touch screen, a touch pad, a keyboard, a mouse, a camera, a microphone, an accelerometer, a gyroscope, or the like; an output device 907 comprising, for example, a Liquid Crystal Display (LCD), a speaker, a vibrator, or the like; a storage device 908 comprising, for example, a magnetic tape, a hard disk, or the like; and a communication device 909. The communication device 909 may allow the electronic device 900 to be in wireless or wired communication with other devices to exchange data. Although FIG. 9 shows the electronic device 900 with various devices, it should be understood that, there is no requirement to implement or have all the devices shown. It is possible to alternatively implement or provide more or less devices.

In particular, according to an embodiment of the present disclosure, the process described above in conjunction with the flowchart may be implemented as a computer software program. For example, in an embodiment of the present disclosure, there comprises a computer program product, which comprises a computer program carried on a non-transitory computer-readable medium, wherein the computer program contains program codes for executing the method shown in the flowchart. In such embodiment, the computer program may be downloaded and installed from the network through the communication device 909, installed from the storage device 908, or installed from the ROM 902. When the computer program is executed by the processing device 901, the above-described functions defined in the method of the embodiment of the present disclosure are performed.

It is to be noted that, the above-described computer-readable medium of the present disclosure may be a computer-readable signal medium, a computer-readable storage medium or any combination thereof. The computer-readable storage medium may be, for example, but is not limited to: an electrical, magnetic, optical, electromagnetic, infrared, or semiconductor system, device, or apparatus, or a combination thereof. More specific examples of the computer-readable storage medium may comprise, but is not limited to: an electrical connection having one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In the present disclosure, a computer-readable storage medium may be any tangible medium that contains or stores a program which may be used by an instruction execution system, apparatus, or device or used in combination therewith. In the present disclosure, the computer-readable signal medium may comprise a data signal propagated in a baseband or as a part of a carrier wave, wherein a computer-readable program code is carried. Such propagated data signal may take many forms, comprising but not limited to an electromagnetic signal, an optical signal, or any suitable combination thereof. The computer-readable signal medium may also be any computer-readable medium other than the computer-readable storage medium. The computer-readable signal medium may send, propagate, or transmit a program for use by an instruction execution system, apparatus, or device or in combination with therewith. The program code contained on the computer-readable medium may be transmitted by any suitable medium, comprising but not limited to: a wire, an optical cable, radio frequency (RF), and the like, or any suitable combination thereof.

In some embodiments, the electronic device may communicate using any currently known or future developed network protocol such as HTTP (HyperText Transfer Protocol), and may be interconnected with digital data communication in any form or medium (for example, communication network). Examples of communication networks comprise a Local Area Network ("LAN"), a Wide Area Network ("WAN"), an internet (for example, Internet) and an end-to-end network (for example, an ad hoc end-to-end network), as well as any currently known or future developed network.

The above-described computer-readable medium may be comprised in the above-described electronic device; or may also exist alone without being assembled into the electronic device.

The above-described computer-readable medium carries one or more programs that, when executed by the electronic device, cause the electronic device to: detect incoming traffic flowing to a server to determine whether the server is attacked by a distributed denial of service (DDoS); in response to determining that the server is attacked by the distributed denial of service (DDoS), determine whether a message format of a message in the incoming traffic is normal, and intercept the message with an abnormal message format, wherein the incoming traffic is generated based on a quick user datagram protocol internet connection (QUIC) protocol; and intercept an abnormal message in a first message, wherein the first message is a message with a normal message format.

The computer program code for performing the operations of the present disclosure may be written in one or more programming languages or a combination thereof. The above-described programming languages comprise but are not limited to object-oriented programming languages, such as Java, Smalltalk, and C++, and also comprise conventional procedural programming languages, such as "C" language or similar programming languages. The program code may be executed entirely on the user's computer, partly on the user's computer, executed as an independent software package, partly on the user's computer and partly executed on a remote computer, or entirely executed on the remote computer or server. In the case of a remote computer, the remote computer may be connected to the user's computer through any kind of network (comprising a local area network (LAN) or a wide area network (WAN)), or may be connected to an external computer (for example, connected through Internet using an Internet service provider).

The flowcharts and block views in the accompanying drawings illustrate the possibly implemented architectures, functions, and operations of the system, method, and computer program product according to various embodiments of the present disclosure. In this regard, each block in the flowchart or block view may represent a module, a program segment, or a part of code, wherein the module, the program segment, or the part of code contains one or more executable instructions for realizing a specified logic function. It should also be noted that, in some alternative implementations, the functions marked in the block may also occur in a different order from the order marked in the accompanying drawings. For example, two blocks shown in succession which may actually be executed substantially in parallel, may sometimes also be executed in a reverse order, depending on the functions involved. It should also be noted that each block in the block view and/or flowchart, and a combination of the blocks in the block view and/or flowchart, may be implemented by a dedicated hardware-based system that performs the specified functions or operations, or may be implemented by a combination of dedicated hardware and computer instructions.

The modules involved in the described embodiments of the present disclosure may be implemented in software or hardware. The names of the modules do not constitute a limitation on the modules themselves under a certain circumstance.

The functions described hereinabove may be performed at least in part by one or more hardware logic components. For example, without limitation, the hardware logic components of a exemplary type that may be used comprise: a Field Programmable Gate Array (FPGA), an Application Specific Integrated Circuit (ASIC), an Application Specific Standard Product (ASSP), a System on Chip (SOC), a Complex Programmable Logical device (CPLD) or the like.

In the context of the present disclosure, a machine-readable medium may be a tangible medium, which may contain or store a program for use by the instruction execution system, apparatus, or device or use in combination with the instruction execution system, apparatus, or device. The machine-readable medium may be a machine-readable signal medium or a machine-readable storage medium. The machine-readable medium may comprise, but is not limited to, an electronic, magnetic, optical, electromagnetic, infrared, or semiconductor system, device or device, or any suitable combination thereof. More specific examples of the machine-readable storage medium may comprise an electrical connection based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof.

The above description is only an explanation of preferred embodiments of the present disclosure and the applied technical principles. Those skilled in the art should understand that the scope of disclosure involved in the present disclosure is not limited to the technical solutions formed by the specific combination of the above technical features, and at the same time should also cover other technical solutions formed by arbitrarily combining the above-described technical features or equivalent features without departing from the above disclosed concept. For example, the above-described features and the technical features disclosed in the present disclosure (but not limited thereto) having similar functions are replaced with each other to form a technical solution.

In addition, although the operations are depicted in a specific order, this should not be understood as requiring these operations to be performed in the specific order shown or performed in a sequential order. Under certain circumstances, multitasking and parallel processing might be advantageous. Likewise, although several specific implementation details are contained in the above discussion, these should not be construed as limiting the scope of the present disclosure. Certain features that are described in the context of individual embodiments may also be implemented in combination in a single embodiment. On the contrary, various features described in the context of a single embodiment may also be implemented in multiple embodiments individually or in any suitable sub-combination.

In some embodiments of the present disclosure, a computer program is provided, wherein the computer program comprises: instructions that, when executed by a processor, cause the processor to implement the traffic processing method described above.

Although the present subject matter has been described in language specific to structural features and/or methodological actions, it should be understood that, the subject matter defined in the appended claims is not necessarily limited to the specific features or actions described above. On the contrary, the specific features and actions described above are only exemplary forms of implementing the claims. Regarding the device in the above-described embodiment, the specific manner of performing an operation by each module therein has been described in detail in the embodiments concerning this method, and thus will not be elaborated in detail here.

What is claimed is:

1. A traffic processing method performed by a protection device, comprising:

detecting incoming traffic flowing to a server to determine whether the server is attacked by a distributed denial of service (DDoS) comprises:

detecting mirror traffic obtained by performing mirroring on the incoming traffic flowing to the server to count a real-time packet total of a port 443 of the server in real time, wherein the incoming traffic is generated based on a quick user datagram protocol internet connection (QUIC) protocol, and wherein the port 443 is a port used by the QUIC protocol; and determining, based on the real-time packet total of the port 443, that the server is attacked by the distributed denial of service (DDoS);

in response to determining that the server is attacked by the distributed denial of service (DDoS), determining whether a message format of a message in the incoming traffic is normal, and intercepting the message with an abnormal message format; and intercepting an abnormal message in a first message comprises:

obtaining, for the first message, a message type of the first message; and intercepting the abnormal massage in the first message according to a protection policy corresponding to the message type of the first message, wherein the first message is a message with a normal message format.

2. The traffic processing method according to claim 1, wherein in response to determining that the server is attacked by the distributed denial of service (DDoS), the determining of whether the message format of the message in the incoming traffic is normal, and the intercepting of the message with the abnormal message format comprises:

determining a second message with a message header that is a short header data packet in the incoming traffic in response to determining that the server is attacked by the distributed denial of service (DDoS);

determining that the message format of the second message is abnormal and discarding the second message in response to a length of a user datagram protocol (UDP) load of the second message being less than a length corresponding to a first preset byte; and determining that the message format of the second message is normal in response to the length of the UDP load of the second message being greater than or equal to the length corresponding to the first preset byte.

3. The traffic processing method according to claim 1, wherein in response to determining that the server is attacked by the distributed denial of service (DDoS), the determining of whether the message format of the message in the incoming traffic is normal, and the intercepting of the message with the abnormal message format comprises:

determining a third message with a message header that is a long header data packet in the incoming traffic in response to determining that the server is attacked by the distributed denial of service (DDoS); and determining that the message format of the third message is abnormal and discarding the third message in response to a length of a user datagram protocol (UDP) load of the third message being less than a length corresponding to a second preset byte.

4. The traffic processing method according to claim 3, wherein in response to determining that the server is attacked by the distributed denial of service (DDoS), the determining of whether the message format of the message in the incoming traffic is normal, and the intercepting of the message with the abnormal message format further comprises:

determining whether the third message is an initial message in response to the length of the UDP load of the third message being greater than or equal to the length corresponding to the second preset byte, wherein the initial message is configured to request for establishing connection by a target client initiating the initial message; and determining that the message format of the third message is abnormal and discarding the third message in response to the third message being the initial message and the length of the UDP load of the third message being less than a length corresponding to a third preset byte, wherein the second preset byte is less than the third preset byte.

5. The traffic processing method according to claim 4, wherein in response to determining that the server is attacked by the distributed denial of service (DDoS), the determining of whether the message format of the message in the incoming traffic is normal, and the intercepting of the message with the abnormal message format further comprises:

determining that the message format of the third message is normal in response to the third message being not the initial message and the length of the UDP load of the third message being greater than or equal to the length corresponding to the second preset byte; and determining that the message format of the third message is normal in response to determining that the third message is the initial message and the length of the UDP load of the third message is greater than or equal to the length corresponding to the third preset byte.

6. The traffic processing method according to claim 1, wherein the intercepting of the abnormal massage in the first message according to the protection policy corresponding to the message type of the first message comprises:

for an initial message in the first message, sending, instead of the server, a response message to a target client corresponding to the initial message, wherein the initial message is configured to request for establishing connection by the target client, the response message carries a random character and is configured to instruct the target client to resend the initial message, and the initial message resent by an abnormal client does not carry the random character, and the initial message resent by a normal client carries the random character;

receiving the initial message resent by the target client and verifying whether the initial message resent by the target client carries the random character; and in response to the initial message resent by the target client not carrying the random character, returning to the sending, instead of the server, the response message to the target client corresponding to the initial message to intercept an abnormal message in the message with the normal message format.

7. The traffic processing method according to claim 6, further comprising:

in response to the initial message resent by the target client carrying the random character, adding the target client to a trust list, and sending an interrupting connection message to the target client, wherein the interrupting connection message is configured to interrupt connection between the target client and the protection device, and the message generated by a client added to the trust list is directly sent to the server.

8. The traffic processing method according to claim 1, wherein the intercepting of the abnormal massage in the first message according to the protection policy corresponding to the message type of the first message comprises:

determining the message carrying a target session identifier from a non-initial message in the first message, wherein in the QUIC protocol, messages belonging to different sessions use different session identifiers, and a number of times that the target session identifier appears in a session within a first preset time reaches a first preset number of times; and discarding the message carrying the target session identifier.

9. The traffic processing method according to claim 8, wherein the determining of the message carrying the target session identifier from the non-initial message in the first message comprises:

obtaining five-tuple information corresponding to the non-initial message in the first message, wherein the five-tuple information comprises a source internet protocol (IP) address, a source port, a target IP address, a target port and a protocol type; and determining the message carrying the target session identifier from the non-initial message in the first message according to the five-tuple information.

10. The traffic processing method according to claim 1, wherein the intercepting of the abnormal massage in the first message according to the protection policy corresponding to the message type of the first message comprises:

determining the message carrying a target effective load from a non-initial message in the first message, wherein the target effective load is an effective load with a number of times that the effective load appears among all effective loads within a second preset time reaching a second preset number of times; and discarding the message carrying the target effective load.

11. The traffic processing method according to claim 10, wherein first preset bytes of target effective loads are the same, last preset bytes of the target effective loads are the same, and the target effective load is the effective load with the number of times that the effective load appears among all effective loads within the second preset time reaching the second preset number of times.

12. The traffic processing method according to claim 1, wherein the detecting of the incoming traffic flowing to the server to determine whether the server is attacked by the distributed denial of service (DDoS) further comprises:

determining that the server is attacked by the distributed denial of service (DDoS) in response to the real-time packet total being greater than an attack threshold; and determining that the server is not attacked by the distributed denial of service (DDoS) in response to the real-time packet total being less than or equal to the attack threshold.

13. A non-transitory computer-readable medium having a computer program stored thereon that, when executed by a processing device, being implemented by a processor, causes the processing device to:

detect incoming traffic flowing to a server to determine whether the server is attacked by a distributed denial of service (DDoS) comprises:

detecting mirror traffic obtained by performing mirroring on the incoming traffic flowing to the server to count a real-time packet total of a port 443 of the server in real time, wherein the incoming traffic is generated based on a quick user datagram protocol internet connection (QUIC) protocol, and wherein the port 443 is a port used by the QUIC protocol; and determining, based on the real-time packet total of the port 443, that the server is attacked by the distributed denial of service (DDoS);

in response to determining that the server is attacked by the distributed denial of service (DDoS), determine whether a message format of a message in the incoming traffic is normal, and intercept the message with an abnormal message format; and intercept an abnormal message in a first message comprises:

obtaining, for the first message, a message type of the first message; and intercepting the abnormal massage in the first message according to a protection policy corresponding to the message type of the first message, wherein the first message is a message with a normal message format.

14. The non-transitory computer-readable medium according to claim 13, wherein the computer program, when executed by the processing device, causes the processing device to:

determine a second message with a message header that is a short header data packet in the incoming traffic in response to determining that the server is attacked by the distributed denial of service (DDoS);

determine that the message format of the second message is abnormal and discard the second message in response to a length of a user datagram protocol (UDP) load of the second message being less than a length corresponding to a first preset byte; and determine that the message format of the second message is normal in response to the length of the UDP load of the second message being greater than or equal to the length corresponding to the first preset byte.

15. The non-transitory computer-readable medium according to claim 13, wherein the computer program, when executed by the processing device, causes the processing device to:

determine a third message with a message header that is a long header data packet in the incoming traffic in response to determining that the server is attacked by the distributed denial of service (DDoS); and determine that the message format of the third message is abnormal and discard the third message in response to a length of a user datagram protocol (UDP) load of the third message being less than a length corresponding to a second preset byte.

16. The non-transitory computer-readable medium according to claim 15, wherein the computer program, when executed by the processing device, further causes the processing device to:

determine whether the third message is an initial message in response to the length of the UDP load of the third message being greater than or equal to the length corresponding to the second preset byte, wherein the initial message is configured to request for establishing connection by a target client initiating the initial message; and determine that the message format of the third message is abnormal and discard the third message in response to the third message being the initial message and the length of the UDP load of the third message being less than a length corresponding to a third preset byte, wherein the second preset byte is less than the third preset byte.

17. An electronic device, comprising:

a storage device having a computer program stored thereon; and a processing device, being implemented by one or more processors, configured to execute the computer program in the storage device to:

detect incoming traffic flowing to a server to determine whether the server is attacked by a distributed denial of service (DDoS) comprises:

detecting mirror traffic obtained by performing mirroring on the incoming traffic flowing to the server to count a real-time packet total of a port 443 of the server in real time, wherein the incoming traffic is generated based on a quick user datagram protocol internet connection (QUIC) protocol, and wherein the port 443 is a port used by the QUIC protocol; and determining, based on the real-time packet total of the port 443, that the server is attacked by the distributed denial of service (DDoS);

in response to determining that the server is attacked by the distributed denial of service (DDoS), determine whether a message format of a message in the incoming traffic is normal, and intercept the message with an abnormal message format; and intercept an abnormal message in a first message, comprises:

obtaining, for the first message, a message type of the first message; and intercepting the abnormal massage in the first message according to a protection policy corresponding to the message type of the first message, wherein the first message is a message with a normal message format.

18. The electronic device according to claim 17, wherein the processing device configured to execute the computer program in the storage device to:

determine a second message with a message header that is a short header data packet in the incoming traffic in response to determining that the server is attacked by the distributed denial of service (DDoS);

determine that the message format of the second message is abnormal and discard the second message in response to a length of a user datagram protocol (UDP) load of the second message being less than a length corresponding to a first preset byte; and determine that the message format of the second message is normal in response to the length of the UDP load of the second message being greater than or equal to the length corresponding to the first preset byte.

19. The electronic device according to claim 17, wherein the processing device configured to execute the computer program in the storage device to:

determine a third message with a message header that is a long header data packet in the incoming traffic in response to determining that the server is attacked by the distributed denial of service (DDoS); and determine that the message format of the third message is abnormal and discard the third message in response to a length of a user datagram protocol (UDP) load of the third message being less than a length corresponding to a second preset byte.

20. The electronic device according to claim 19, wherein the processing device configured to execute the computer program in the storage device to:

determine whether the third message is an initial message in response to the length of the UDP load of the third message being greater than or equal to the length corresponding to the second preset byte, wherein the initial message is configured to request for establishing connection by a target client initiating the initial message; and determine that the message format of the third message is abnormal and discard the third message in response to the third message being the initial message and the length of the UDP load of the third message being less than a length corresponding to a third preset byte, wherein the second preset byte is less than the third preset byte.

* * * * *